United States Patent Office.

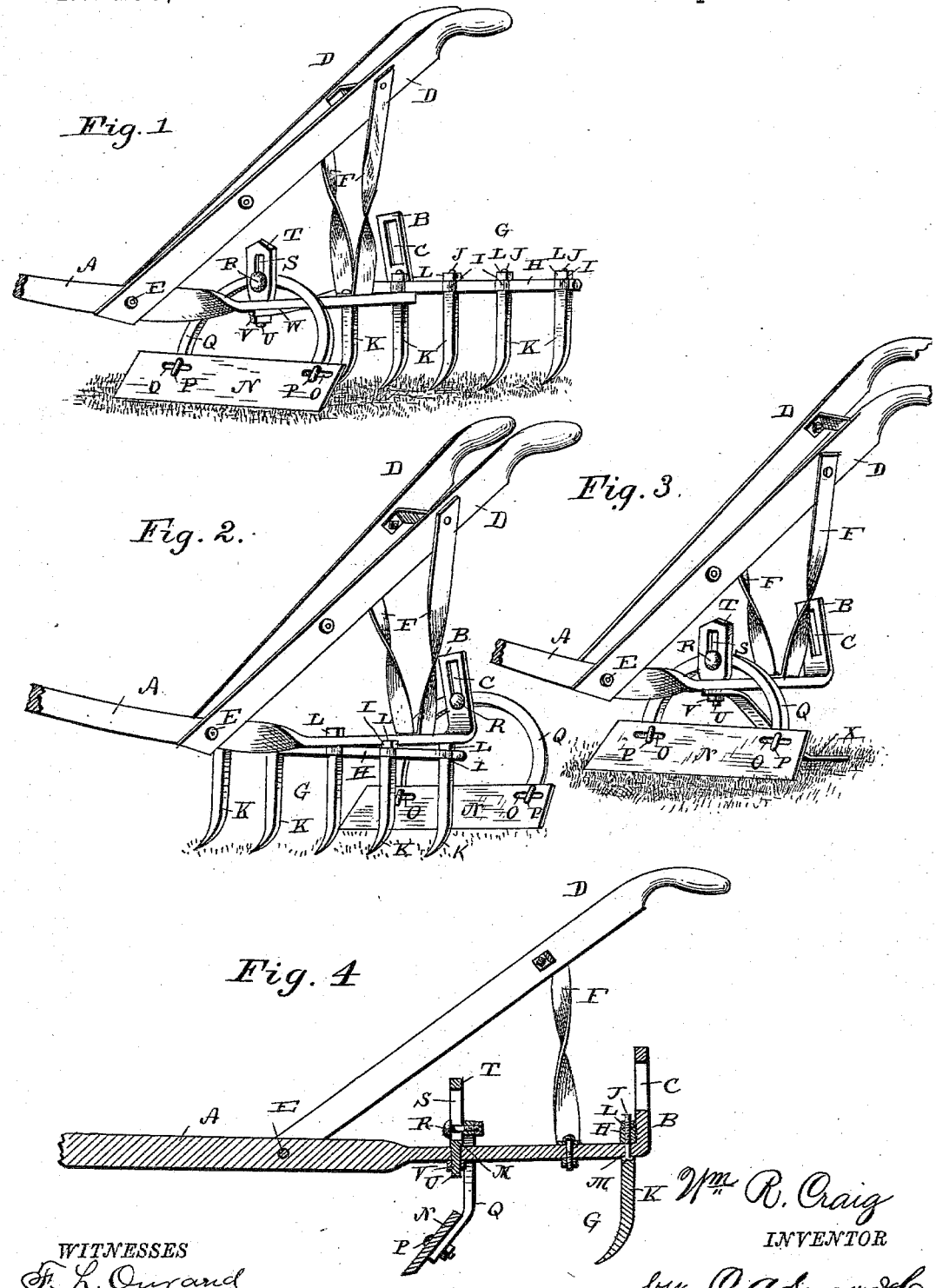

WILLIAM R. CRAIG, OF COLUMBIA, TENNESSEE.

CULTIVATING HARROW AND SCRAPER.

SPECIFICATION forming part of Letters Patent No. 296,732, dated April 15, 1884.

Application filed June 15, 1883. Renewed March 13, 1884. (No model.)

*To all whom it may concern:*

Be it known that I, WILLIAM R. CRAIG, a citizen of the United States, residing at Columbia, in the county of Maury and State of Tennessee, have invented a new and useful Cultivating Harrow and Scraper, of which the following is a specification, reference being had to the accompanying drawings.

This invention relates to an improved combined harrow and scraper for cultivating cotton and the like; and it consists in certain improvements in the construction of the same, which will be hereinafter fully described, and particularly pointed out in the claim.

In the drawings hereto annexed, Figure 1 is a perspective view of my improved combined harrow and scraper, showing the scraper arranged in front of the harrow. Fig. 2 is a similar view, showing the harrow in front of the scraper. Fig. 3 is a perspective view of the device equipped with the scraper, and with the gage-spring for the latter; and Fig. 4 is a longitudinal vertical sectional view of the device shown in Fig. 1.

The same letters refer to the same parts in all the figures.

A in the drawings designates the beam, which is preferably a suitably-constructed iron beam, having at its rear end an upturned bracket, B, provided with a vertical slot, C.

D D are the handles, the front lower ends of which are secured to the beam by a transverse bolt, E, while their rear ends are connected with the rear part of the beam by means of braces F.

G designates a suitably-constructed harrow, consisting of a beam, H, having eyes I, to receive the shanks J of the teeth K, which said shanks are screw-threaded to receive nuts L, by which they are held securely in position. The shank J of one of the teeth should be of sufficient length to extend through a vertical perforation, M, in the beam A. The latter is provided with two or more of such perforations, in order that the harrow may be attached thereto in any position desired.

In Fig. 1 the harrow is shown attached near the rear end of the beam, behind the scraper, which is designated by letter N, and which consists of a suitable blade having horizontal slots O, to receive bolts P, by which it is connected adjustably to the lower ends of a horseshoe-shaped arm or bail, Q. The latter is connected adjustably by a central bolt or pivot, R, to a vertical slot, S, in a plate, T, having at its lower end a threaded shank, U, extending through one of the perforations M in the beam A, to which it is secured by a nut, V. It will be seen that the bail Q straddles the beam A, in relation to which it may be adjusted to any desired position, thus placing the scraper-blade in a level or inclined position, and at any desired angle to the row of plants to be cultivated. The shank U of the plate T is connected with one end of the harrow-beam by a brace, W, thus retaining the said harrow-beam in its proper position during operation.

As shown in Fig. 2, the position of the harrow and scraper may be reversed, so as to bring the scraper behind the harrow. In this case I prefer to dispense with the slotted plate T and connect the bail Q, carrying the scraper, to the vertically-slotted bracket B, at the rear end of the beam. The device may also, when desired, be used with either the harrow or the scraper alone. When the scraper alone is used, I gage the depth to which it is desired to have it run by means of a flat elongated S-shaped spring, X, mounted upon the the shank U of plate T, as shown in Fig. 3, and dragging upon the ground after the scraper. The latter, as has been already explained, may be adjusted vertically in relation to the gage-spring, thus causing it to run to any desired depth in the ground.

The operation and advantages of this invention will be readily understood from the foregoing description, taken in connection with the drawings hereto annexed. It is simple, convenient, inexpensive, and easily operated, and it may be readily adapted to various uses which will at once suggest themselves to those familiar with this class of devices.

I claim as my invention and desire to secure by Letters Patent of the United States—

The combination of the beam having one or more vertical perforations, a vertically-slotted plate having a screw-threaded shank, nutted to said beam, a bail bolted adjustably to said slotted plate and straddling the beam, and a scraper having slots through which pass bolts, by which it is connected adjustably to the ends of the said bail, as set forth.

In testimony that I claim the foregoing as my own I have hereto affixed my signature in presence of two witnesses.

WILLIAM R. CRAIG.

Witnesses:
L. P. PADGETT,
N. R. WILKES.